United States Patent
Carney et al.

(10) Patent No.: US 10,198,724 B2
(45) Date of Patent: Feb. 5, 2019

(54) PAYMENT NETWORKS AND METHODS FOR FACILITATING DATA TRANSFERS WITHIN PAYMENT NETWORKS

(71) Applicant: MASTERCARD INTERNATIONAL INCORPORATED, Purchase, NY (US)

(72) Inventors: Kevin S. Carney, St. Peters, MO (US); Pierce A. Collins, Drogheda (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 685 days.

(21) Appl. No.: 14/832,368

(22) Filed: Aug. 21, 2015

(65) Prior Publication Data
US 2017/0053258 A1 Feb. 23, 2017

(51) Int. Cl.
| | |
|---|---|
| *H04L 12/26* | (2006.01) |
| *H04L 12/28* | (2006.01) |
| *H04L 12/46* | (2006.01) |
| *H04L 12/707* | (2013.01) |
| *H04L 12/725* | (2013.01) |
| *G06Q 20/22* | (2012.01) |
| *G06Q 20/32* | (2012.01) |

(52) U.S. Cl.
CPC ......... *G06Q 20/223* (2013.01); *G06Q 20/325* (2013.01); *H04L 12/28* (2013.01); *H04L 12/4633* (2013.01); *H04L 43/08* (2013.01); *H04L 45/22* (2013.01); *H04L 45/306* (2013.01)

(58) Field of Classification Search
CPC ..... H04L 45/00; H04L 12/5602; H04L 63/02; H04L 47/10; H04L 63/06; H04L 12/28; H04L 43/08; H04L 45/22; H04L 45/306; H04L 12/4633; G06Q 20/223; G06Q 20/325
USPC .......................................................... 705/39
See application file for complete search history.

(56) References Cited

U.S. PATENT DOCUMENTS

| | | | | |
|---|---|---|---|---|
| 4,578,530 A | * | 3/1986 | Zeidler .................. | G06Q 20/02 380/277 |
| 6,243,667 B1 | * | 6/2001 | Kerr ....................... | H04L 45/00 370/379 |
| 6,252,848 B1 | * | 6/2001 | Skirmont ............... | H04L 47/10 370/229 |

(Continued)

OTHER PUBLICATIONS http://www.cisco.com/c/en/us/td/docs/net_mgmt/vpn_solutions_center/2-0/ip_security/provisioning/guide/IPsecPG1.html#wp1002608; web accessed May 27, 2015; 16 pgs.

*Primary Examiner* — Clifford B Madamba
(74) *Attorney, Agent, or Firm* — Harness, Dickey & Pierce, P.L.C.

(57) ABSTRACT

Exemplary payment networks and methods are provided for facilitating data transfers. One exemplary method includes determining a performance of a first path through a first WAN between a hub and a customer, determining a performance of a second path through a second different WAN between the hub and the customer, causing a data traffic associated with a first class of application to be routed along the first path when the performance of the first path is within a first performance threshold, and causing the data traffic, when routed along the first path, to be switched to the second path when the performance of the first path fails to satisfy and/or violates the performance threshold.

20 Claims, 3 Drawing Sheets

(56) References Cited

U.S. PATENT DOCUMENTS

| | | | | |
|---|---|---|---|---|
| 6,381,649 B1* | 4/2002 | Carlson | ............... | H04L 12/5602 |
| | | | | 370/230 |
| 8,037,302 B2* | 10/2011 | Vaarala | ................... | H04L 63/02 |
| | | | | 713/160 |
| 2004/0093419 A1* | 5/2004 | Weihl | ...................... | H04L 63/06 |
| | | | | 709/229 |

* cited by examiner

PAYMENT NETWORKS AND METHODS FOR FACILITATING DATA TRANSFERS WITHIN PAYMENT NETWORKS

FIELD

The present disclosure generally relates to payment networks and methods for facilitating the transfer of data within the payment networks.

BACKGROUND

This section provides background information related to the present disclosure which is not necessarily prior art.

A variety of data transfers occur within a payment network to permit the authorization, clearing, and settlement of payment account transactions among issuers and/or acquirers to the transactions. In addition to transaction authorization, clearance, and settlement, the payment network is embodied to provide a variety of services between the payment network and customers of the payment network, including, the issuers, the acquirers, and third parties who provide services to the payment network, etc. In general, the payment network operates to ensure responses, often prompt responses, to transactions, while permitting secure movement of data through the payment network.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment networks provide data transfer between data centers and customers (e.g., third party networks, remote data centers, or other customers/partners, etc.) through third party carriers, such as telecommunications providers. The networks and methods herein provide a dynamic network with multiple paths (or routes), supported by multiple wide area networks (WANs) disposed between a data center and each customer, so that traffic to/from the customer may be shifted between different paths based on performance. In particular, traffic specific to sensitive applications/services, may be transferred along a preferred path to a customer and switched between the preferred path and a different path to the customer to enhance and/or ensure performance. In this manner, the network is able to maintain data transfer along one of the multiple paths, generally independent of the particular WAN, and switch the data transfer to a different path when the original path is degraded below one or more thresholds. Additionally, the paths are defined by dynamically generated tunnels, which permit not only direct access between the data center and the customer, but also between customers. The network further provides enhanced security by relying on certificate-based encryption (e.g., IPSec, etc.), which is managed centrally for efficient access, issuance and revocation.

Figure 1:
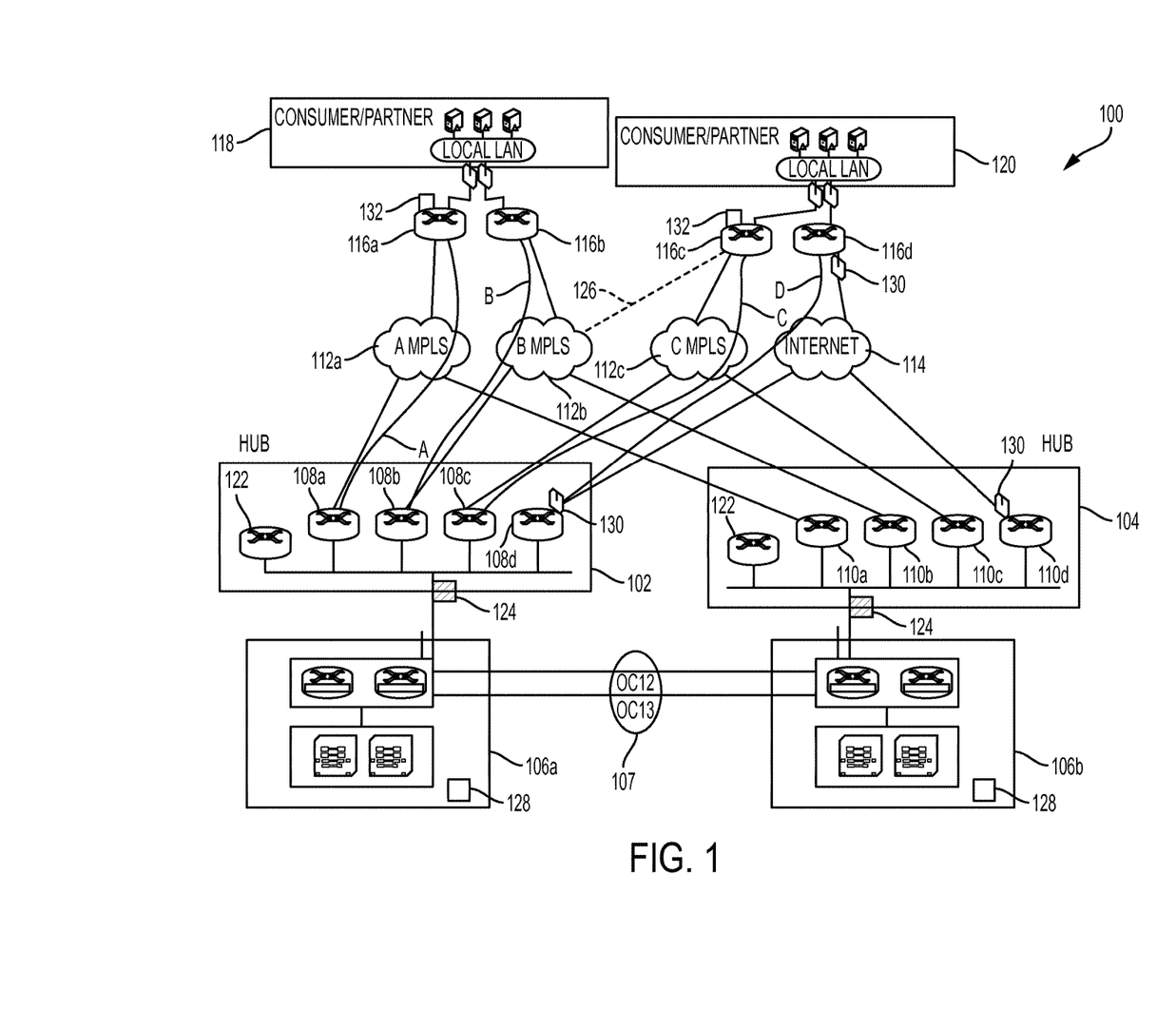
FIG. 1 is a block diagram of an exemplary payment network of the present disclosure suitable for use in facilitating transfers of data between customers (or consumers) and a hub of the payment network, and also between customers.

FIG. 1 illustrates an exemplary network 100, in which the one or more aspects of the present disclosure may be implemented. Although parts of the network 100 are presented in one arrangement, other embodiments may include the same or different parts arranged otherwise, depending, for example, on the types and/or priorities of applications within the network 100, the interactions of the applications with the network 100, etc.

In the exemplary embodiment, the network 100 is a payment network connected to various customers, which interact with the payment network to provide and/or receive information related to transactions among customers/merchants (e.g., authorization, clearing, settlement, etc.) and/or services offered by a service provider to customers of the network 100, or to data transactions between data centers in different geographic regions. The network 100 includes a primary hub 102 and a backup hub 104, each connected to data centers 106a-b. The data centers 106a-b host a variety of different types of information related to the payment network 100 and transactions within the payment network (or, as stated above, other related services), etc. Generally, the data centers 106a-b, when separated, are located in different geographic regions, such that they may serve primary/backup roles, in this embodiment, as environmental conditions may limit the performance, availability, and/or access to only one of the data centers 106a-b. The data centers 106a-b are coupled to one another in the network 100 by a dedicated network (e.g., WAN, etc.), indicated by 107. The dedicated network 107, or communication media, permits the data centers 106a-b to be redundant, as necessary.

Each of the hubs 102 and 104 includes multiple routers 108a-d and 110a-d, respectively. The routers 108a-c and 110a-c are coupled to at least one of wide area networks (WANs) 112a-c, as illustrated in FIG. 1, for each of customers 118 and 120. In this exemplary embodiment, the WANs 112 include multiprotocol label switching (MPLS) networks, provided by one or more third parties, such as, for example, telecommunication providers, etc. The WANs 112, which may include a variety of different implementations/parties, provide a network that generally spans a geographic region, such as, for example, a state, county, country, continent, or the globe, etc. In addition to the WANs 112, the network 100 further includes, or is coupled to, the Internet 114.

With continued reference to FIG. 1, the WANs 112 are coupled to edge routers 116a-d The edge routers 116 are located proximate to and are coupled to the customers 118 and 120, respectively. The customers 118 and 120, in the illustrated embodiment, include banks or bank associated institutions, which function as issuers of payment accounts, and/or acquirers of transactions from merchants, or another entity which provides services within the payment network 100 (e.g., rewards entities, authentication entities, etc.), etc. In one or more embodiments, one or more merchants may be a customer to a network, potentially depending on, for example, its size, volume of transactions, and/or other interactions with the payment network, etc. Further, in at least one embodiment, the customer 118 or customer 120 may include a separate data center, which is related to data centers 106 (i.e., a redundant or backup data center), located in a different geographic region. For example, the data centers 106, as part of a global network for Bank Company, may host data for a first region (e.g., the United States, etc.), while a separate data center of Bank Company may host data for a separate region (e.g., Europe, or India, etc.). In such an example, the separate data center may be represented as the customer 118, in this exemplary embodiment, described herein.

As shown in FIG. 1, each of the routers 108 of the hub 102 is coupled to one of the WANs 112, or the Internet 114. As shown, router 108a is coupled to WAN 112a; the router 108b is coupled to WAN 112b; the router 108c is coupled to WAN 112c; and the router 108d is coupled to the Internet 114. Likewise, as shown, router 110a is coupled to WAN 112a; the router 110b is coupled to WAN 112b; the router 110c is coupled to WAN 112c; and the router 110d is coupled to the Internet 114. Proximate to customers 118 and 120, the WAN 112a is coupled to edge router 116a; the WAN 112b is coupled to edge router 116b; the WAN 112c is coupled to edge router 116c; and the Internet 114 is coupled to edge router 116d. In this manner, the data transfer path from the data center 106a to the customer 118 may include the WAN 112a and/or WAN 112b, i.e., different paths, and separately, the data transfer paths from the data center 106a to the customer 120 may include the WAN 112c and/or Internet 114.

Because the same structure is repeated, in this exemplary embodiment, between each of customers 118 and 120 and the hub 102 and the backup hub 104, if issues arise with either the hub 102, or the backup hub 104, data transfers provided by a problematic hub may alternately be provided through the other hub.

Further, while only two customers 118 and 120 are shown in FIG. 1, a different number of customers may be included in the network 100. Generally, consistent with customer 118, for example, the network will associate at least two routers (e.g., edge routers 116a-b) to each customer, with each router coupled to a different WAN and/or the Internet, thereby providing two potential communication paths to the additional customer. In one or more embodiments, however, certain customers may be coupled to the network 100, via multiple routers (e.g., two or more), while other customers may be coupled to the hub via only one router. The availability of one or more alternate paths to/from the customer may impact the implementation of one or more aspects described herein.

Furthermore, while only two WANs or one WAN and one Internet are illustrated as coupled to each customer 118 and 120 in the network 100 in FIG. 1, it should be appreciated, however, that depending on desired performance, for example, the customers 118 and 120 (and/or other customers supported by the network 100) may be coupled to additional WANs and/or Internets (e.g., three, five, eight, etc.), whereby routing, as described herein, could be done between the customers 118 and 120 and the data centers 106a and 106b, via additional paths therebetween. In one particular example, up to eight different WANs and/or Internets may be coupled between a like number of hub routers in the hub 102 and a like number of edge routers at the customer 118. Further still, the hub 102 and/or hub 104 may be coupled to more or less WANs and/or Internets, in other payment network embodiments, again depending on, for example, desired performance, etc., with more WANs and/or Internets coupled to certain customers and less WANs and/or Internets coupled to other customers.

Traffic in the network 100 (i.e., data transfers) may be related to payment transactions (e.g., authorizations, clearing, settlement, etc.), file transfer applications/services, mobile application support, operations, interactive (e.g., HTTP, etc.), management, video applications/services, voice applications/services, etc. Despite these specific examples, it should be appreciated that any different kind of data transfers may be effected within network 100, whether related or unrelated to payment transactions, applications and/or services, etc. More generally, in various embodiments, the network 100 may be unrelated to a payment network, or payment transactions.

With further reference to FIG. 1, each of the hubs 102 and 104 includes a routing engine 122, which in this embodiment, is a router. The routing engine 122 coordinates traffic along different paths from the respective hubs 102, 104 to customers 118 and 120. In the network 100, paths A and B are provided between the customer 118 and the hub 102. Likewise, paths C and D are provide between the customer 120 and the hub 102. In this exemplary embodiment, an additional path 126 exists between the WAN 112b and the router 116c, i.e., the different customers 118 and 120 are coupled to the same WAN, as will be described below. The routing engine 122 is configured to respond to one or more parameters and/or rules to route the traffic from hub 102 to customer 118, for example, along either path A through WAN 112a or path B through WAN 112b.

As shown in FIG. 1, the edge routers 116a and 116c each include a routing engine 132. Specifically, rather than a separate router like routing engines 122 in hubs 102 and 104, in this exemplary embodiment, the routing engines 132 are embedded in the edge routers 116a and 116c, as shown. The routing engines 122 or 132, whether as standalone routers, or otherwise implemented in other devices, or embedded in other devices, such as a router, performs substantially consistent with the description herein. For ease of reference, however, the description is presented with reference to routing engine 122, but the statements and descriptions are equally applicable to the routing engines 132.

In one example, the routing engine 122 relies on a preferred path, load balancing, and/or one or more thresholds, in part, to make a selection between different paths A and B for the transfer of data between hub 102 and customer 118, and further, to switch the data transfer between different paths A and B. The threshold, as described in more detail below, may relate to, for example, percentage loss (e.g., byte loss percentage, packet loss percentage, etc.), latency of the path, jitter, percentage of bandwidth, etc. The threshold may be generic to the data being transferred to/from the customer 118, or may be specific to the type or class application associated with the data being transferred to/from the customer 118. For example, particular applications (e.g., voice applications, etc.) may have a higher value of thresholds on path performance (e.g., 3% packet loss percentage, etc.), to ensure, provide and/or preserve quality of service. Conversely, a batch file transfer related to clearing/settlement may be classified with a less stringent, or lower value, threshold (e.g., 10% packet loss percentage, etc.) as minor delay(s) in the transfer generally have minor or no impact on the overall settlement process. In general, the routing engine 122 is application/service aware, in that it includes one or more data structures (e.g., tables, lists, etc.) in which different traffic types are identified (by characteristic(s) and/or content of packets in the data traffic), so that the routers 108, for example, are able to inspect packets as received to identify the type of application/service associated with the data traffic. As such, traffic may be routed for the specific applications/services, thereby providing greater sensitivity to specific application/service performance considerations. Without limitation, in determining particular applications/services to which particular data traffic relates, the routing engine 122 may monitor traffic flow for particular issues, cause probes to be transmitted between routers associated with the hub 102, etc. Uniquely, therefore, the path is not merely changed in a failed path scenario, but it may further be changed or switched based on altered or degraded path performance scenarios (e.g., based on failure to satisfy and/or violation of one or more thresholds, etc.).

In the embodiment of FIG. 1, routing parameters and/or rules are stored in memory (e.g., memory 204, etc.) in the routing engine 122, at hub 102. A copy of such routing parameters and/or rules is included at hub 104 as well, in routing engine 122, for use when hub 104 is employed as a back-up hub, or otherwise. Further, each router 108 relies on the routing engine 122 for such parameters and/or configuration rules. The routing engine 122 relies on loopback addresses for one or more operations, including receiving configurations, creating at least one routing table for network prefixes (e.g., for network 100, etc.), and sending probes along multiple different access paths, etc. In short, it is the routing engine 122 that controls traffic between different paths from the hub 102 (or hub 104) to customers 118 and 120 (and other customers).

In addition to threshold based routing, as indicated above, the routing engine 122, at each of hubs 102 and 104, may also be configured to employ one or more of a preferred path for specific applications (or classes of applications), load balancing, and application diversity between the paths. For example, the routing engine 122, at hub 102, is configured to originally select path A through WAN 112a over path B through WAN 112b, based on the preferred path A (e.g., an application-specific path, etc.), etc. Once selected, in various embodiments, the routing engine 122 is configured to continue to compare the performance of available paths (e.g., path A and path B, etc.), and potentially switch paths, if the prior selected path performance degrades below one or more thresholds (potentially regardless of preferred paths, load balancing, etc.). The routing engine 122 thus is able to select and/or improve/preserve the performance of the data transfer from the data center 106a, through the hub 102, to the customer 118 via path A or path B, as needed.

Generally, the paths A, B, C, and D, in this exemplary embodiment, are tunnels, and specifically, GRE (generic routing encapsulation) tunnels. The tunnels are generated (automatically, in this embodiment) on-demand dynamically, by the edge routers 116 (or, more generally, in the direction of the originator of the data transfer (e.g., routers 108, 110 or 116, etc.)), to support transfer of data between the hub 102 (i.e., routers 108) and edge routers 116, as needed. Further, the tunnels may be provided for customer-to-customer transfers, whereby access to the data centers 106 is not required. In several embodiments, the tunnels are automatically generated, starting at the edge routers 116, and are deleted, by the routing engines 122 (and/or routers 116) when not in use, either immediately or after an expiration period.

The description herein is generally limited to paths A-D, between the data centers 106 and customers 118 and 120. It should be appreciated, however, that customer-to-customer data transfers are also provided in the network 100, as indicated below.

In the exemplary embodiment of FIG. 1, the tunnels (e.g., paths A-D, etc.) are encrypted with Internet Protocol Security (IPSec), which is provided to encrypt data as it exits the routers 108 and 110 to the WANs 112 toward the customers 118 and 120, and/or as it exits the edge routers 116 to the WANs 112 (or Internet 114) toward the data centers 106. The hubs 102 and 104 and edge routers 116 then decrypt incoming data from the WANs 112 or Internet 114. In addition in this embodiment, the network 100 further includes firewalls 130, which are separate from and/or integrated with the routers 108d, 110d, and 116d. The firewalls 130, and not the respective routers 108d, 110d, and 116d, in this example, encrypt and decrypt the data, via IPSec, flowing to and from the Internet 114. As such, regardless of WAN or Internet, the network 100 provides end-to-end encryption of data transfers (i.e., routers 108, 110, and 116 at either end of the WANs 112 or Internet 114). It should be appreciated that the illustration of firewalls 130, associated with particular routers 108d, 110d, and 116d, does not suggest that firewalls may not be disposed elsewhere in the network 100 of FIG. 1, to perform one or more functions related to encryption.

In this exemplary embodiment, encryption may reduce the types of traffic that the routers 108, 110, and 116 identify, and thus, may provide simplified routing of traffic. The encryption further permits efficiency in the creation and maintenance of access filters, at network routers (shown and not shown), which may be added, as desired, to govern the routers' interactions with the WANs 112 and may provide additional edge security to network 100.

Encryption of data transfer in the tunnels (e.g., paths A-D, etc.), as described in more detail below, is based on certificates. In this exemplary embodiment, each of the data centers 106 includes a certificate server 128, as shown. When any of the routers 108, 110, and 116, are initialized, the routers contact the appropriate certificate server 128, to receive a certificate, by sending information (e.g., router name, identifier/ID, location, etc.) to the certificate server 128. In turn, the certificate server 128, if approved, creates a public certificate for the routers 108, 110, and 116, signs it, and returns it to the routers 108, 110, and 116. In this manner, the hub routers 108 and 110 and the edge routers 116 are IPSec peers within the network 100. The certificate then provides the IPSec keys for the encryption/decryption of the data transferred, at the hubs 102 and 104 and the routers 108, 110 and 116.

As an example, to open a tunnel to another router, such as router 108a (prior to routing any traffic), the router 116a sends its certificate. The router 108a reviews and verifies the certificate, before responding with its own certificate to the router 116a. When the router 116a reviews and verifies the certificate, a trust is created between the two routers 116a and 108a, by which a tunnel is generated and data may then be transferred therebetween (i.e., IPSec encrypted data). Because the customers 118 and 120 are both connected to the WANs 112 (the edge router 116c is connected by path 126), in this example, the routers 116b and 116c are able to communicate using a similar process. When router 116b wants to open a path to router 116c, it sends a message to hub 102, which is redirected, by the router 108b, to the router 116c (along a tunnel between router 108c and 116c). The router 116c, in turn, reviews and verifies a certificate included in the message from the router 116b, and then provides its certificate back to router 116b, which permits (upon verification of the certificate), the routers 116b and 116c to generate a tunnel (i.e., IPsec tunnel in this embodiment) directly therebetween (without passing data through the hubs 102 and 104).

Further in the network 100, the data centers 106 are protected with intrusion detection sensors (IDS) 124. In the exemplary embodiment, the sensors 124 at the data centers 106 are part of or coupled to the hubs 102 and 104. The sensors are configured to inspect every packet (i.e., 100%), or a high percentage of packets (e.g., 95%, 99%, 99.9%, etc.), received by the hubs 102 and 104 (and/or the data centers 106) for signatures of intrusion, viruses, malware, hacks, etc., or other signatures of attack on the network 100, and specifically, the hubs 102 and 104 and/or the data centers 106a-b. It should be appreciated that the sensors 124 may be employed elsewhere in different network embodiments, or even omitted, in other embodiments.

Figure 2:
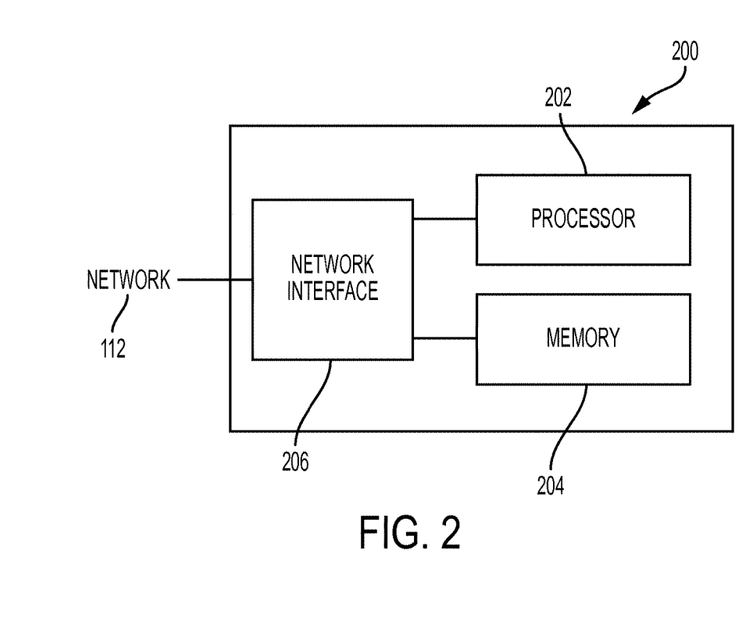
FIG. 2 is a block diagram of a computing device that may be used in the exemplary system of FIG. 1.

For illustration, the network 100 is described herein with reference to an exemplary computing device 200, as shown in FIG. 2. Generally, the data centers 106, the routers 108, 110 and 116, and the customers 118 and 120, as illustrated in FIG. 1, are embodied in one or more computing devices, such as the computing device 200, etc. The network 100, and its parts, however, should not be considered to be limited to the computing device 200, as different computing devices, and/or arrangements of computing devices may be used in other embodiments.

As shown in FIG. 2, the exemplary computing device 200 generally includes a processor 202, and a memory 204 coupled to the processor 202. The processor 202 may include, without limitation, a central processing unit (CPU), a microprocessor, a microcontroller, a programmable gate array, an application-specific integrated circuit (ASIC), a logic device, or the like. The processor 202 may be a single core processor, a multi-core processor, and/or multiple processors distributed within the computing device 200. The memory 204 is a computer readable media, which includes, without limitation, random access memory (RAM), a solid state disk, a hard disk, compact disc read only memory (CD-ROM), erasable programmable read only memory (EPROM), tape, flash drive, and/or any other type of volatile or nonvolatile physical or tangible computer-readable media. Memory 204 may be configured to store, without limitation, routing protocols, classifications of applications/ services, rules, thresholds, and/or other types of data suitable for use as described herein.

The computing device 200 further includes a network interface 206 coupled to the processor 202, which permits communication with the various other components included in the network 100. The network interface 206 generally includes one or more wired network adapters, suitable for use as described herein, but may also include one or more wireless network adapters, or other devices capable of communicating to one or more of the same or different networks.

The computing device 200, as used herein, performs one or more functions, which may be described in computer executable instructions stored on memory 204 (e.g., a computer readable storage media, etc.), and executable by one or more processors 202. The computer readable storage media is a non-transitory computer readable media. By way of example, and without limitation, such computer readable storage media can include RAM, read-only memory (ROM), Electrically Erasable Programmable Read-Only Memory (EEPROM), CD-ROM or other optical disk storage, magnetic disk storage or other magnetic storage device, or any other medium that can be used to carry or store desired program code in the form of executable instructions or data structures and that can be accessed by a computer. Combinations of the above should also be included within the scope of computer-readable media.

Figure 3:
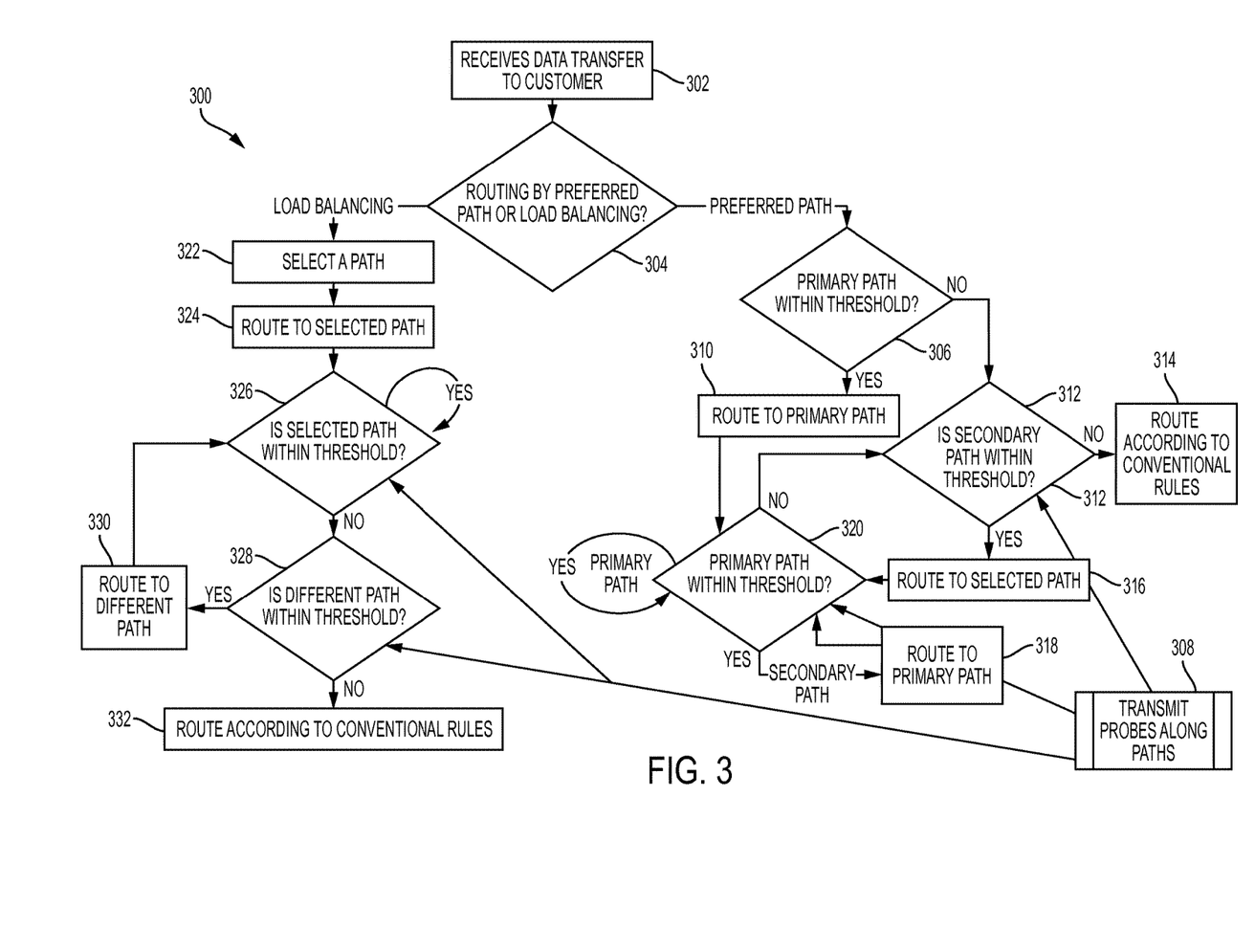
FIG. 3 is an exemplary method for use in facilitating the transfer of data between a customer and a data center, or between two customers, and suitable for use in the payment network of FIG. 1.

FIG. 3 illustrates an exemplary embodiment of a method 300 for use in facilitating transfers of data within a payment network. The exemplary method 300 is described with reference to the network 100, and the computing device 200. The method 300, however, should not be understood to be limited to the network 100 and/or computing device 200, as other networks and computing devices may be employed to perform the method 300. Conversely, network 100 and computing device 200 should not be understood to be limited to the method 300.

The routing engines 122 generally operate to provide access for the customers 118 and 120 to the data at the data centers 106, to receive data from the customers 118 and 120 to the data centers 106, and further to provide services offered by the payment network 100, based on access to the data centers 106, to the customers 118 and 120, and to other customers, for example, within the network 100. The routing engines 122, in this embodiment, initially rely on preferred routing or load balancing, when data traffic is initiated, and further rely on path preference and thresholds to further select, maintain and/or switch among potential paths between the customers 118 and 120 and the data centers 106, for example. In the exemplary method 300, the routing engine 122 of hub 102 is providing access between customer 118 and data center 106a, through either path A or path B. It should be appreciated, as described above, that other paths may be employed to provided access (e.g., to enable data transfers, etc.), between the illustrated and/or other data centers and customers.

While the method 300 is described with reference to routing engine 122, specifically the routing engine 122 that is part of hub 102, the description is applicable to the routing engine 122 of hub 104, and also the routing engines 132 in the edge routers 116.

As shown in FIG. 3, in the method 300, the routing engine 122 of hub 102 receives, at 302, a request to transfer data to the customer 118. Despite the exemplary flow of data in this description, it should be appreciated that data may flow in either direction between the customers 118 and 120, the hubs 102 and 104, and the data centers 106.

At, 304, the routing engine 122 determines if the data should be routed according to load balancing, or according to a preferred path. The option for load balancing or preferred path is generally selected by the operator and/or designer of the network 100 to provide consistent and/or efficient service, and specifically, quality of service, to the customers 118 and 120 and the data centers 106. Routing may be selected, in general, for all data traffic, or it may be specific and particular to different classes, applications/ services, and/or information. In the exemplary embodiment, the applications/services are often organized into different classes, based on a number of factors, such as, for example, the importance of the data traffic in the class, etc. For example, a higher threshold of performance may be required for video or voice applications, than batch file transfers. It may be determined to be advantageous to select a particular preferred path for classes, or, alternatively, to ensure particular classes are handled consistent with load balancing, depending on the particular embodiment.

For purposes of illustration, path A is considered to be a primary path, and path B is considered to be a secondary or backup path. As shown in FIG. 3, when preferred path routing is indicated, at 304, the routing engine 122 determines, at 306, whether the preferred path, i.e., primary path A, in this example, is within a threshold. In particular, at 308, different routers within the network 100 (e.g., routers 108, 110 and 116, etc.) transmit probes along the paths (or tunnels generated as described above) associated with the hub 102 and hub 104, to determine the performance of the paths, relative to one or more thresholds. The probes may be transmitted periodically, for example, every 10 seconds, 15 seconds, 30 seconds, 1 minute, or a different interval depending on the traffic along the path, the type of the WANs 112, etc. In one example, the routers 108, 110 and/or 116 transmit three probes every 1-10 seconds. The routing engine 122 then determines, after 30 seconds, for example, how many of the probes were received back to the routers 108, 110, and/or 116. For example, if one of the three probes is missed, the loss indicated for the path would be 33%. The performance, based on the probes, is compared to the threshold for the applications/services, and the primary path, at 306, is determined to be within or not within the threshold.

Upon response to the probes, the routers 108, 110 and 116 report back to the routing engine 122 (or routing engine 132) certain information such as, for example, timing of the probes, number of probes, response to probes, etc., which is specific to one or more performance characteristic(s) of interest. The performance characteristic(s) may include, without limitation, byte loss, packet loss, bandwidth used percentages, jitter, latency, etc. The routing engine 122, in turn, employs one or multiple thresholds, to determine if the path performance, specific to the characteristic(s) of interest (potentially specific to an application class), has degraded and/or is suitable for use. It should be appreciated that the thresholds, at 306 (or at 312, 320, 326, and 328, described below), may be different for different applications/services within the network 100. Further, in multiple embodiments, as indicated above, the network 100 divides different applications/services into different classes. Different classes may be assigned different thresholds, depending on, for example, the importance of the data traffic in the class. The different traffic (or applications or services) may be defined in different classes, whereby the routing engine 122 would act more or less quickly to alter the routing path of the traffic, when degradation of the path is detected. Like the performance parameters, for example, the thresholds may also be based on byte loss, packet loss, bandwidth used percentages, jitter, latency, etc.

In this exemplary embodiment, when the path performance is within the thresholds (e.g., the packet loss is below about 5%, etc.), the routing engine 122 routes the data to the primary path A, at 310

Conversely, if the primary path A is not within the threshold, at 306, the routing engine 122 determines, at 312, whether the secondary path, (i.e., path B, in this example) is within one or more thresholds. The threshold may be the same, similar, or different than the threshold employed, at 306. In this particular example, the threshold is packet loss below about 5%, and is the same as the threshold employed at 306. Again, however, different thresholds and/or a different number of thresholds, based on the same or different performance characteristic(s), may be used in other routing engine embodiments.

If path B is not within the threshold, at 312, the routing engine 122 falls back to conventional routing rules and/or techniques, at 314, including for example, bandwidth delay, route summarizations, etc., associated with one or more routing protocols to thereby select between the available paths. Alternatively, if path B is within the threshold, the routing engine 122 routes the data to the secondary path B, at 316.

Because, at this part of the method 300, the routing engine 122 is still governed by the preferred path selection at 304, the routing engine 122 attempts to maintain the data traffic on the primary path, i.e., path A. The routing engine 122 is therefore configured to keep or return the data to the primary path. Thus, after the routing engine 122 switches the data to path B, at 316, the routing engine 122 determines, at 320, if path A is within one or multiple thresholds, and continues to determine, at 320, if the primary path is within the threshold, at a regular or irregular interval, regardless of whether the secondary path is within one or more thresholds. The determination is again based on the probes transmitted at 308.

When the primary path, or path A, comes within the threshold at 320, the routing engine 122 switches the traffic back to primary path A, at 318. And then returns to operation 320, to continue to determine if the primary path A is within one or more thresholds. If the primary path A is within the threshold, at 320, and the current path is the primary path A, the routing engine 122 takes no action, and returns to (or maintains at) operation 320 to, again, determine if the primary path A is within one or more thresholds, in a loop at a regular or irregular interval (e.g., every 3 minutes, 5 minutes, 18 minutes, or other predefined interval, etc.).

Referring still to FIG. 3, alternately, at 304, the routing engine 122 of hub 102 may route data based on load balancing. In particular, the routing engine 122 may balance the traffic based on, for example, the destination and the differentiated services code point (DSCP) within the traffic, which alone or in combination with other parameters, is used in one or more algorithms to shift load among the multiple paths, i.e., paths A and B. For example, if the data to be transferred is the same as an existing or recent data transfer (e.g., it includes the same destination and DSCP, etc.), the routing engine 122 will route the data along the same path. However, if the transfer is different (e.g., either the destination or DSCP is different, etc.), the routing engine 122 routes the data transfer based on, for example, load, performance, and other parameters indicative of the quality of the path, etc. Based on a comparison among the available paths, the routing engine 122 selects a path for the traffic. Different algorithms may be employed for determining load balancing and for directing traffic. Algorithms, for example, may permit new and existing traffic to be distributed between available paths, based on better characteristics in one path over another, with a ceiling for each path, e.g., 95% of bandwidth, etc., after which balancing would not be used to further load the path.

It should be appreciated that, in various embodiments, a variety of criteria may be employed in load balancing, so that one path is not loaded to the point of substantially degrading performance of the network 100. In one or more embodiments, load balancing may be applied or not applied based on the class of the application/service traffic (e.g., as defined by DSCP settings, etc.) to be routed.

With continued reference to FIG. 3, relying on load balancing, the routing engine 122 selects a path (e.g., path A or path B) to route traffic, at 322, and then routes the data traffic along the selected path as described above, at 324. Consistent with the description above, the routers 108, 110, and 116 transmit probes along the selected path, and then report one or more performance characteristics of the selected path (e.g. path A, etc.) to the routing engine 122 (or routing engine 132). The routing engine 122, in turn, determines, at 326, based on the performance, whether the selected path is within one or more thresholds. The threshold used, generally relates to the performance characteristic(s) of the selected path, including, for example, byte loss, packet loss, bandwidth used percentages, jitter, latency, etc. When the selected path is not within the threshold, at 326, the routing engine 122 determines if the alternate path (i.e., unselected path B) is within the threshold, at 328. If the alternate path is within the threshold, the routing engine 122 routes the data traffic along the different path, i.e., the newly selected path, at 330. Alternatively, if the alternate path is not within the threshold, at 328, the routing engine 122 routes the data traffic according to conventional routing rules and/or techniques, at 332. Operations 326-332 are repeated, as necessary, so that data traffic is maintained on an available path (i.e., the selected path), which is within the threshold for the particular application, class, or in general.

Consistent with the above, regardless of whether the routing engine 122, or routing engine 132, employs preferred path or load balancing at 304, the network 100 is able to provide two paths for data transfers, while also providing sensitivity to the particular applications/services at issue. For example, the routing engine 122 may act to decouple and switch traffic associated with some applications/services to a different path, while leaving other traffic associated with other applications on a previously selected path. The network 100 is customizable so that routing among the routers 108, 110, and 116, via the WANs 112a-c and the Internet 114 may be selected based on the particular performance of the paths, and also the performance needs of particular applications and/or services.

Referring again to FIG. 1, and as previously described, to provide the data paths A, B. C and D, the network 100 provides tunnels, generally, through the WANs 112 and Internet 114. Tunneling may, in various embodiments, provide scalability, quality of service, increased security, and simplicity for configuration and management. The network 100, and in particular the edge routers 116 and hub routers 108 and 110, each provide a single defined tunnel, which are dynamically generated to provide particular access, and closed when unneeded or unused. In the network 100, path A is defined by a tunnel. The tunnel may be generated to provide access to the hub 102 from the customer 118, to provide access between customers 118 and 120, or to provide access to the backup hub 104 from the customer 118. In particular, when access is provided via hub 102, via a tunnel, the customer 118 (in this example), and in particular, the edge router 116, generates the tunnel to the hub 102. After the tunnel is generated, an enhanced interior gateway routing protocol (EIGRP) neighbor is created between the hub 102 and the customer 118, and data is transferred over the generated tunnel.

Conversely, for customer-to-customer access (between customer 118 to customer 120, for example), which is generally only created when needed or on demand, a different process is provided. Initially, the hub 102 (and in particular, router 108b) receives a connection from the router 116b, for example, to a destination site associated with router 116c (associated with customer 120). The hub 102 then forwards the request to the router 116c, and the hub 102 informs the router 116c (e.g., instructs the router 116c, etc.) about direct access to the router 116b, via the WANs 112 (or Internet 114). Further the hub 102 creates a next hop resolution protocol (NHRP) entry for the customer's prefix (i.e., prefix for router 116b) in its routing tables. The router 116c then forwards the response directly to the customer 118, via its interface to WANs 112. Router 116b then creates a NHRP entry for the prefix for router 116c. The customers 118 and 120 are then able to communicate, directly between routers 116, over a tunnel therebetween. This connection may, for example, remain open for a predefined interval, such as, for example, 2 minutes, 5 minutes, 10, minutes, etc., after a last packet of data is exchanged between customer 118 and customer 120 (and in particular, routers 116).

The backup hub 104 provides redundant access, if issues arise with hub 102. Specifically, upon failure of hub 102, the hub 104 establishes the same tunnel with customers 118 and 120, and between the customers as existed at the primary hub 102, based on static maps contained in each of the routers 108, 110 and 116. For example, when a connection is created between router 116a and router 108a, a connection is also created to router 110a (as indicated in a static map). The traffic to the data center 106a is handled between the routers 116a and 108a, as long as hub 102 is operational. Upon failure, the router 116a invokes the connection to router 110a, indicated in the static map, to further handle the traffic.

In another aspect of the disclosure, IPSec provides the framework used to issue and maintain certificates to the routers 108, 110 and 116 included in the network 100. While the description herein is presented with reference to IPSec, it should be appreciated that other similar protocols may be used, in other embodiments, for secured communication between devices. IPSec provides data encryption at the IP packet layer, which may provide scalable, secure, and standards-based security solutions for tunnel encryption (as described above). The encryption is provided between the hubs 102 and 104, between the hubs 102 and 104 and the customers 118 and 120, and between the customers 118 and 120 (and/or other customers). In particular, IPSec employs a simple certificate enrollment protocol (SCEP) for handling certificates (e.g., issuing, renewing, revoking, etc.) within the network 100, and by the certificate server 128. For the hubs 102 and 104, enrollment is accomplished via the data centers 106, at the corresponding certificate server 128. For routers (e.g., routers 116, etc.) remote from the hubs 102 and 104, the enrollment is accomplished via temporary border gateway protocol (BGP) routes installed over one or more of the WANs 112. The initial request for certificates, i.e., enrollment, is unencrypted traffic within the network 100.

In particular, a router (e.g., one of routers 116, etc.) obtains a copy of the certificate and then generates a certificate signing request (CSR), based on, for example, a local key pair and the name of the router. The CSR is sent, by the router (e.g., one of routers 116, etc.), to the certificate server 128. The router then polls the certificate server 128 to check whether the certificate had been signed. Once the certificate is signed, it is returned to the router, where the signed certificate is written to memory, such as, non-volatile memory (e.g., non-volatile random access memory (NVRAM), etc.). The certificate is used, by the router 116, to service SCEP requests to the services network and/or to permit interactions with the other parts of the network 100, such as, for example, to generate and/or access dynamic tunnels.

After the certificate is issued, each router re-enrolls (e.g., via the IPSec tunnel, etc.), as necessary, in order to maintain a certificate and, as a result, access within the network 100. In this exemplary embodiment, the certificates are valid for a predetermined period, such as, for example, 1 year, 2 years, 4 years, or other suitable intervals, etc. The router seeks to re-enroll sufficiently in advance of the expiration of the certificate so that the certificate server 128 issues/signs the new certificate before the expiration of the prior certificate. For example, when a certificate is valid for 2 years, re-enrollment may be initiated by the router between 16 and 20 months, or other interval less than 2 years. To the extent a router is removed from the network 100 and/or a customer opts not to participate in the network 100 (e.g., for one or more business reasons, etc.), the certificate for the router is revoked. In this manner, decommissioning a router, or other device, from the network 100 is more efficient than, for example, distributing new or different keys, for which a change would require touching each of the routers. In the exemplary embodiment, a certificate revocation list is maintained at the certificate server 128, and disseminated, as necessary, for maintenance of the network 100. Specifically, when a router is decommissioned, or taken down, it is removed from the list of routers (e.g., a static router map, etc.) within the certificate server 128. As routers 108, 110, and 116 update themselves, at regular or irregular intervals (e.g., every 15 minutes, 20 minutes, 7 days, etc.), the router, which has been decommissioned, is no longer included in the updated router maps. As such, the decommissioned router is unable to communicate within the network 100.

In various embodiments, payment networks and methods herein thus may employ one or more forwarding tables and/or one or more filters in a global routing domain to handle data traffic within the payment networks. Consequently, multiple domains may be avoided, thereby providing efficiency and/or simplicity to the payment networks and/or maintenance thereof.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by: (a) determining, by a routing engine, a performance of a first path between a hub associated with a payment network data center and a customer, the first path defined by a first tunnel through a first wide area network (WAN) between the hub and a first edge router associated with the customer, the hub including the router, (b) determining, by the routing engine, a performance of a second path between the hub and the customer, the second path defined by a second tunnel through a second WAN between the hub and a second edge router associated with the customer, (c) causing, by the routing engine, a data traffic to be initially routed along the first path, (d) selecting a first performance threshold for the data traffic based on a class of application associated with the data traffic, (e) switching, by the routing engine, the traffic to the second path, when the first path fails to satisfy and/or violates the first performance threshold and the second path does not fail to satisfy and/or violate the second performance threshold, (f) transmitting probes along the first path and the second path at one or more intervals; (g) switching the first data traffic from the secondary path to the first preferred path when the data traffic is routed along the second path, but the performance of the first path is within the performance threshold; (h) routing the data traffic along a first path when the performance of the first path is within a performance threshold and the data traffic is associated with a first class of application, but routing the data traffic along a second path when a performance of the first and second path is within a performance threshold and the data traffic is associated with a second class of application; and (i) routing data traffic along a path, when the path is within the performance threshold, wherein the performance threshold includes a first value when the data traffic is associated with a first application and a second different value when the data traffic is associated with a different application.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments disclosed herein may provide all or none of the above mentioned advantages and improvements, and still fall within the scope of the present disclosure.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A network for facilitating data transfer between a customer and at least one of a different customer and a payment network data center, the network comprising:

a hub coupled to a data center and including a first hub router coupled to a first wide area network (WAN) and a second hub router coupled to at least one of a second WAN and/or an Internet;
a first edge router coupled to a customer and the first WAN, the first edge router including an engine, the first edge router configured to generate a first tunnel between the first edge router and the first hub router, via the first WAN; and
a second edge router coupled to said customer and the at least one of the second WAN and/or the Internet, the second edge router configured to generate a second tunnel between the second edge router and the second hub router, via the at least one of the second WAN and/or the Internet, wherein the engine is configured to route data traffic between the hub and said customer, along the first tunnel, based on a first performance threshold of the first tunnel and to switch the data traffic to the second tunnel, when the first tunnel fails to satisfy the first performance threshold.

2. The network of claim 1, wherein the engine is further configured to route the data traffic between the hub and the first edge router based on a preferred path; and
wherein the first tunnel is the preferred path; and
wherein the engine is still further configured to switch the data traffic back to the first tunnel, after switching to the second tunnel, when the first tunnel no longer fails to satisfy the first performance threshold.

3. The network of claim 1, wherein the first performance threshold includes one of: byte loss, packet loss, jitter, or latency.

4. The network of claim 1, wherein the first edge router is configured to encrypt the data traffic to be transferred, prior to transmitting the data traffic into the first tunnel; and
wherein the first edge router is configured to encrypt the data traffic based on a certificate stored at the first edge router.

5. The network of claim 4, wherein each of the first edge router, the second edge router, the first hub router, and the second hub router are IPSec peers within said network.

6. The network of claim 1, wherein the engine is further configured to route different data traffic between the hub and said customer along the second tunnel, when the data traffic is routed along the first tunnel, thereby providing data traffic along two separate paths.

7. The network of claim 6, wherein a second performance threshold is associated with the second tunnel; and
wherein the engine is further configured to switch the different data traffic from the second tunnel to the first tunnel, when the second tunnel fails to satisfy the second performance threshold.

8. The network of claim 7, wherein the engine is further configured to route the data traffic based on the first performance threshold and a class of an application associated with the data traffic; and
wherein the engine is further configured to route the different data traffic between the hub and said customer along the second tunnel based on a class of an application associated with the different data traffic.

9. The network of claim 7, wherein the first and second edge routers are configured to transmit multiple probes along the first tunnel and along the second tunnel; and
wherein the engine is further configured to determine a performance of the first tunnel relative to the first performance threshold based on the multiple probes transmitted along the first tunnel and to determine a performance of the second tunnel relative to the second performance threshold based the multiple probes transmitted along the second tunnel.

10. The network of claim 1, wherein the data center includes a certificate server coupled to the hub, the certificate server configured to:
issue a certificate to each of the first edge router and the first hub router, whereby the first edge router and the first hub router are able to verify one another, prior to the first tunnel being generated between the first edge router and the first hub router.

11. The network of claim 10, wherein the certificate server is configured to remove the certificate of first edge router from a directory of certificates, when the first edge router is decommissioned, such that the first and the second hub routers are unable to verify said certificate of the first edge router.

12. The network of claim 1, wherein the data traffic includes transaction data associated with at least one payment account transaction.

13. The network of claim 1, further comprising a third edge router coupled to at least one of said customer and/or a different customer, the third edge router also coupled to at least one of a third WAN and/or the Internet;
wherein the hub includes a third hub router coupled to the third WAN and/or the Internet;
wherein the third edge router is configured to generate a third tunnel between the third edge router and the third hub router, via the at least one of the third WAN and/or the Internet; and
wherein the engine is configured to switch the data traffic to one of the second tunnel and the third tunnel, when the first tunnel fails to satisfy the first performance threshold.

14. The network of claim 1, wherein the hub further includes at least one intrusion detection sensor (IDS) coupled to the first and second hub routers and configured to inspect one or more packets received by the hub to identify a signature of an attack.

15. A non-transitory computer readable storage media including computer executable instructions for routing data traffic in a payment network that, when executed by at least one processor, cause the at least one processor to:
determine a performance of a first path between a hub and a customer, the first path defined by an encrypted tunnel through a first wide area network (WAN) between the hub and a first edge router associated with the customer;
determine a performance of a second path between the hub and the customer, the second path defined by a tunnel, through one of a second different WAN and/or an Internet, between the hub and a second edge router associated with the customer;
initially route data traffic along the first path when the performance of the first path is within a first performance threshold;
initially route the data traffic along the second path, when the performance of the first path is not within the performance threshold, but the performance of the second path is within a second performance threshold; and
switch the data traffic from the first path to the second path when the data traffic is routed along the first path, but the performance of the first path is not within the performance threshold while the performance of the second path is within a second performance threshold.

16. The non-transitory media of claim 15, wherein the first performance threshold and the second performance threshold each includes a threshold for one of: byte loss, packet loss, jitter, or latency.

17. The non-transitory media of claim 16, wherein the first performance threshold includes a first value when the data traffic is associated with a first application and a second different value when the data traffic is associated with a different application.

18. The non-transitory media of claim claim 15, wherein the computer executable instructions, when executed by the at least one processor, further cause the at least one processor to switch the data traffic from the second path to the first path when the data traffic is routed along the second path, but the performance of the first path is within the performance threshold.

19. The non-transitory media of claim claim 15, wherein the computer executable instructions, when executed by the at least one processor, further cause the at least one processor to:
  initially route the data traffic along the first path when the performance of the first path is within a first performance threshold and the data traffic is associated with a first class of application; and
  initially route the data traffic along the second path, when the performance of the second path is within the second performance threshold and the data traffic is associated with a second class of application.

20. A computer-implemented method for facilitating data transfers within a payment network, the method comprising:
  determining, by a routing engine, a performance of a first path between a hub associated with a payment network data center and a customer, the first path defined by a first tunnel through a first wide area network (WAN) between the hub and a first edge router associated with the customer, the hub including the router;
  determining, by the routing engine, a performance of a second path between the hub and the customer, the second path defined by a second tunnel through a second WAN between the hub and a second edge router associated with the customer;
  causing, by the routing engine, a data traffic to be initially routed along the first path;
  selecting a first performance threshold for the data traffic based on a class of application associated with the data traffic; and
  switching, by the routing engine, the traffic to the second path, when the first path fails to satisfy the first performance threshold and the second path does not fail to satisfy the second performance threshold.

* * * * *